United States Patent
Yoshida et al.

(10) Patent No.: US 8,710,790 B2
(45) Date of Patent: Apr. 29, 2014

(54) FUEL CELL SYSTEM, AND ELECTRIC VEHICLE EQUIPPED WITH THE FUEL CELL SYSTEM

(75) Inventors: Michio Yoshida, Miyoshi (JP); Atsushi Imai, Gamagori (JP); Tomoya Ogawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 388 days.

(21) Appl. No.: 13/259,374

(22) PCT Filed: Mar. 18, 2010

(86) PCT No.: PCT/IB2010/000570
§ 371 (c)(1),
(2), (4) Date: Sep. 23, 2011

(87) PCT Pub. No.: WO2010/113000
PCT Pub. Date: Oct. 7, 2010

(65) Prior Publication Data
US 2012/0019191 A1    Jan. 26, 2012

(30) Foreign Application Priority Data
Mar. 31, 2009   (JP) ................................ 2009-085109

(51) Int. Cl.
*H01M 10/46*   (2006.01)
(52) U.S. Cl.
USPC ........................................................ 320/101
(58) Field of Classification Search
USPC .......... 320/101, 104, 107, 112, 127, 128, 137
See application file for complete search history.

(56) References Cited

U.S. PATENT DOCUMENTS

| 5,023,150 A | 6/1991 | Takabayashi | |
|---|---|---|---|
| 2003/0194586 A1 | 10/2003 | Sugiura et al. | |
| 2007/0207356 A1 | 9/2007 | Miyata | |
| 2008/0081235 A1* | 4/2008 | Yamaga et al. | 429/23 |
| 2010/0055521 A1 | 3/2010 | Umayahara et al. | |
| 2012/0274137 A1* | 11/2012 | Yoshida et al. | 307/43 |

FOREIGN PATENT DOCUMENTS

| EP | 1 414 091 A2 | 4/2004 |
|---|---|---|
| JP | 2002-034171 A | 1/2002 |
| JP | 2007-026891 A | 2/2007 |

(Continued)

OTHER PUBLICATIONS

International Search Report mailed Jul. 13, 2010 in PCT/IB2010/000570 & Written Opinion (previously filed).

(Continued)

*Primary Examiner* — Edward Tso
(74) *Attorney, Agent, or Firm* — Kenyon & Kenyon LLP

(57) ABSTRACT

A fuel cell system comprising a fuel cell that generates electricity through an electrochemical reaction between a fuel gas and an oxidant gas, and a control portion that controls amount of electricity generation at a time of starting the fuel cell, characterized in that the control portion has voltage drop control means for controlling speed of dropping a starting voltage of the fuel cell from an open-circuit voltage to a high-potential-avoiding voltage according to an initial voltage of the fuel cell and to a pre-determined threshold voltage that is lower than the high-potential-avoiding voltage, when the starting voltage of the fuel cell is dropped from the open-circuit voltage to the high-potential-avoiding voltage.

8 Claims, 5 Drawing Sheets

(56) References Cited

FOREIGN PATENT DOCUMENTS

| | | |
|---|---|---|
| JP | 2008-218398 A | 9/2008 |
| WO | 2008099743 A1 | 8/2008 |
| WO | 2008/108451 A1 | 9/2008 |
| WO | 2009/066586 A1 | 5/2009 |
| WO | WO2010112995 * | 10/2010 |

OTHER PUBLICATIONS

International Preliminary Report on Patentability issued Jul. 1, 2011.

* cited by examiner

FUEL CELL SYSTEM, AND ELECTRIC VEHICLE EQUIPPED WITH THE FUEL CELL SYSTEM

This is a 371 national phase application of PCT/IB2010/000570 filed 18 Mar. 2010, claiming priority to Japanese Patent Application No. 2009-085109 filed 31 Mar. 2009, the contents of which are incorporated herein by reference.

BACKGROUND OF THE INVENTION

1. Field of the Invention

The invention relates to a fuel cell system, and to a vehicle equipped with the fuel cell system.

2. Description of the Related Art

Practical application of a fuel cell that supplies hydrogen as a fuel gas to a fuel electrode, and that supplies air as an oxidant gas to an oxidant electrode, and that generates electricity through an electrochemical reaction between hydrogen and oxygen in the air while producing water on an oxidant electrode is now being considered.

In such a fuel cell, if at the time of start of operation, the pressure of hydrogen supplied to the fuel electrode and the pressure of air supplied to the oxidant electrode are about equal to the respective pressures occurring during ordinary operation, it sometimes happens that hydrogen gas and air are unevenly distributed in the fuel electrode and the oxidant electrode, respectively, and the electrodes are degraded by electrochemical reaction caused by the uneven distribution of these gases. Japanese Patent Application Publication No. 2007-26891 (JP-A-2007-26891) discloses a method of preventing the degradation of the electrodes of a fuel cell by causing the pressures of hydrogen and air supplied to the fuel electrode and the oxidant electrode, respectively, at the time of start of operation of the fuel cell to be higher than the ordinary supplied pressures of these gases.

However, if hydrogen gas and air are supplied at high pressure to a fuel cell when the fuel cell starts operation, it sometimes happen that the rate of rise of the voltage of the fuel cell becomes large so that the voltage of the fuel cell overshoots its upper-limit voltage. In conjunction with this problem, Japanese Patent Application Publication No. 2007-26891 (JP-A-2007-26891) discloses a method in which when hydrogen gas and air are supplied, at the time of starting a fuel cell, at pressures that are higher than their pressures given during ordinary power generation, output electric power is extracted from the fuel cell, and is put out to a vehicle driving motor, resistors, etc., provided that the voltage of the fuel cell reaches a predetermined voltage that is lower than the upper-limit voltage.

In an electric vehicle equipped with a fuel cell, an output electric power command value for the fuel cell is calculated on the basis of a requested electric power from a load system, and the output current-voltage characteristic of the fuel cell. However, at the time of starting the fuel cell, while the voltage of the fuel cell is rising from a starting voltage, electric current does not flow from the fuel cell due to the blocking by a blocking diode. On another hand, for example, in a method in which after the voltage of the fuel cell, at the time of starting the fuel cell, is temporarily raised to an open-circuit voltage (hereinafter, referred to also as "OCV"), a control voltage of the fuel cell is lowered and electric power is extracted from the fuel cell, a control in which the voltage of the fuel cell is set at the OCV so that current does not flow out from the fuel cell until the electricity generation of the fuel cell is permitted. In this case, however, durability of the fuel cell is sometimes impaired.

Therefore, it is desirable that the starting voltage of the fuel cell be promptly dropped from the OCV to a predetermined operation voltage. However, if the total cell voltage of a fuel cell stack is always dropped at low speed for fear of excessive electricity generation of the fuel cell at the time of starting the fuel cell, a very long time is required for the drop of the voltage from the OCV to the predetermined operation voltage. Furthermore, if the total cell voltage is dropped at low speed in the case where the initial total cell voltage of the fuel cell is higher than the voltage in an ordinary operation state, an upper-limit guard for the command voltage that is commanded to the fuel cell cannot be provided in time, so that the total cell voltage of the fuel cell becomes higher than the predetermined operation voltage, and the total cell voltage of the fuel cell stack overshoots, for example, as shown in FIG. 5.

Besides, in the case where the fuel cell generates more electric power than requested by the load system, the surplus amount of electric power is charged into a secondary cell that is provided in the electric vehicle. If the secondary cell is charged in a manner of, for example, high-rate charging, charging from a high SOC (state of charge), charging at low temperature (e.g., 0° C.) (charging in a high resistance state), etc., the secondary cell sometimes becomes overcharged, so that durability of the secondary cell may be impaired.

SUMMARY OF THE INVENTION

The invention provides a fuel cell system that restrains overcharge of a secondary cell by dropping the starting voltage of a fuel cell to a predetermined operation voltage at high speed so that the starting voltage of the fuel cell does not overshoot the predetermined operation voltage, and by preventing excessive electricity generation of the fuel cell according to the initial total cell voltage of the fuel cell, and also provides a vehicle equipped with the fuel cell system.

A fuel cell system in accordance with a first aspect of the invention is a fuel cell system that includes a fuel cell that generates electricity through an electrochemical reaction between a fuel gas and an oxidant gas, and a control portion that controls amount of electricity generation at a time of starting the fuel cell. The control portion has voltage drop control means for controlling speed of dropping a starting voltage of the fuel cell from an open-circuit voltage to a high-potential-avoiding voltage according to an initial voltage of the fuel cell and to a pre-determined threshold voltage that is lower than the high-potential-avoiding voltage, when the starting voltage of the fuel cell is dropped from the open-circuit voltage to the high-potential-avoiding voltage.

At the time of starting the fuel cell, the amount of electricity generated by the fuel cell is adjusted by controlling the speed of drop of the starting voltage of the fuel cell according to the initial voltage of the fuel cell. Therefore, the overcharged state of the secondary cell is avoided, so that durability of the secondary cell is certainly maintained.

In the fuel cell system in accordance with the first aspect, the voltage drop control means may drop the starting voltage of the fuel cell from the open-circuit voltage to the high-potential-avoiding voltage at the high speed if the initial voltage of the fuel cell is less than or equal to the threshold voltage; if the starting voltage of the fuel cell is dropped at the high speed, and a difference between the high-potential-avoiding voltage and a command voltage commanded to the fuel cell reaches 0, the voltage drop control means may complete a control for dropping the starting voltage of the fuel cell to the high-potential-avoiding voltage at the high speed; if the starting voltage of the fuel cell is dropped at the high speed, and a difference between the high-potential-avoiding voltage and a total fuel cell voltage is smaller than a predetermined value, the voltage drop control means may complete a control for dropping the starting voltage of the fuel cell to the high-potential-avoiding voltage at the high speed; and the voltage drop control means may drop the starting voltage of the fuel cell from the open-circuit voltage to the high-potential-avoiding voltage at the low speed if the initial voltage of the fuel cell is greater than the threshold voltage.

In the fuel cell system in accordance with the first aspect, the voltage drop control means may drop the starting voltage of the fuel cell from the open-circuit voltage to the high-potential-avoiding voltage at high speed if the initial voltage of the fuel cell is less than or equal to the threshold voltage, and the voltage drop control means may drop the starting voltage of the fuel cell from the open-circuit voltage to the high-potential-avoiding voltage at low speed provided that the initial voltage of the fuel cell is greater than the threshold voltage, and that a difference between the high-potential-avoiding voltage and a command voltage that is commanded to the fuel cell is greater than 0 or a difference between the high-potential-avoiding voltage and a total fuel cell voltage is greater than a predetermined value.

In the case where the initial voltage of the fuel cell is lower than or equal to the predetermined threshold voltage, the starting voltage of the fuel cell is dropped from the open-circuit voltage (OCV) to the high-potential-avoiding voltage that is a predetermined operation voltage, at the high speed. Therefore, durability of the fuel cell can be maintained. On the other hand, in the case where the initial voltage of the fuel cell is higher than the predetermined threshold voltage, the overcharged state of the secondary cell is avoided by dropping the starting voltage from the open-circuit voltage (OCV) to the high-potential-avoiding voltage that is the predetermined operation voltage, at low speed, in consideration of the condition that the difference between the command voltage commanded to the fuel cell and the high-potential-avoiding voltage be greater than 0 or that the difference between the high-potential-avoiding voltage and the total fuel cell voltage is greater than the predetermined value, in order to restrain excessive electricity generation of the fuel cell. As a result, durability of the secondary cell is certainly maintained.

The fuel cell system in accordance with the first aspect may further have drop speed switch prohibition means for prohibiting the starting voltage of the fuel cell from being dropped to the high-potential-avoiding voltage at the high speed, once the starting voltage of the fuel cell is dropped from the open-circuit voltage to the high-potential-avoiding voltage at the low speed.

For example, in the case where the starting voltage of the fuel cell changes in the vicinity of the threshold voltage, the foregoing construction will prevent the excessive electricity generation of the fuel cell caused by the switching of the starting voltage drop speed from the low speed to the high speed.

In the fuel cell system in accordance with the foregoing first aspect may further have a secondary cell that is charged with electric power that is output from the fuel cell, and that is chargeable and dischargeable. Then, after the voltage drop control means drops the starting voltage of the fuel cell from the open-circuit voltage to the high-potential-avoiding voltage at the low speed, the control portion may start an overcharge-avoiding control of the secondary cell.

Since a control is performed such that excessive electricity generation of the fuel cell is restrained prior to the start of the overcharge-avoiding control of the secondary cell, the overcharged state of the secondary cell is avoided, so that durability of the secondary cell is certainly maintained.

A vehicle in accordance with a second aspect of the invention is a vehicle that has a fuel cell system in accordance with the first aspect.

In an electric vehicle, the invention related to the starting of the fuel cell restrains overcharge of the secondary cell, and prevents performance deterioration of the secondary cell.

According to the invention, since the speed of drop of the starting voltage of the fuel cell is controlled in accordance with the initial voltage of the fuel cell so as to adjust the amount of electricity generation by the fuel cell, the overcharged state of the secondary cell can be avoided.

BRIEF DESCRIPTION OF THE DRAWINGS

The foregoing and/or further objects, features and advantages of the invention will become more apparent from the following description of example embodiments with reference to the accompanying drawings, in which like numerals are used to represent like elements and wherein.

DETAILED DESCRIPTION OF EMBODIMENTS

Hereinafter, embodiments of the invention will be described with reference to the drawings.

Figure 1:
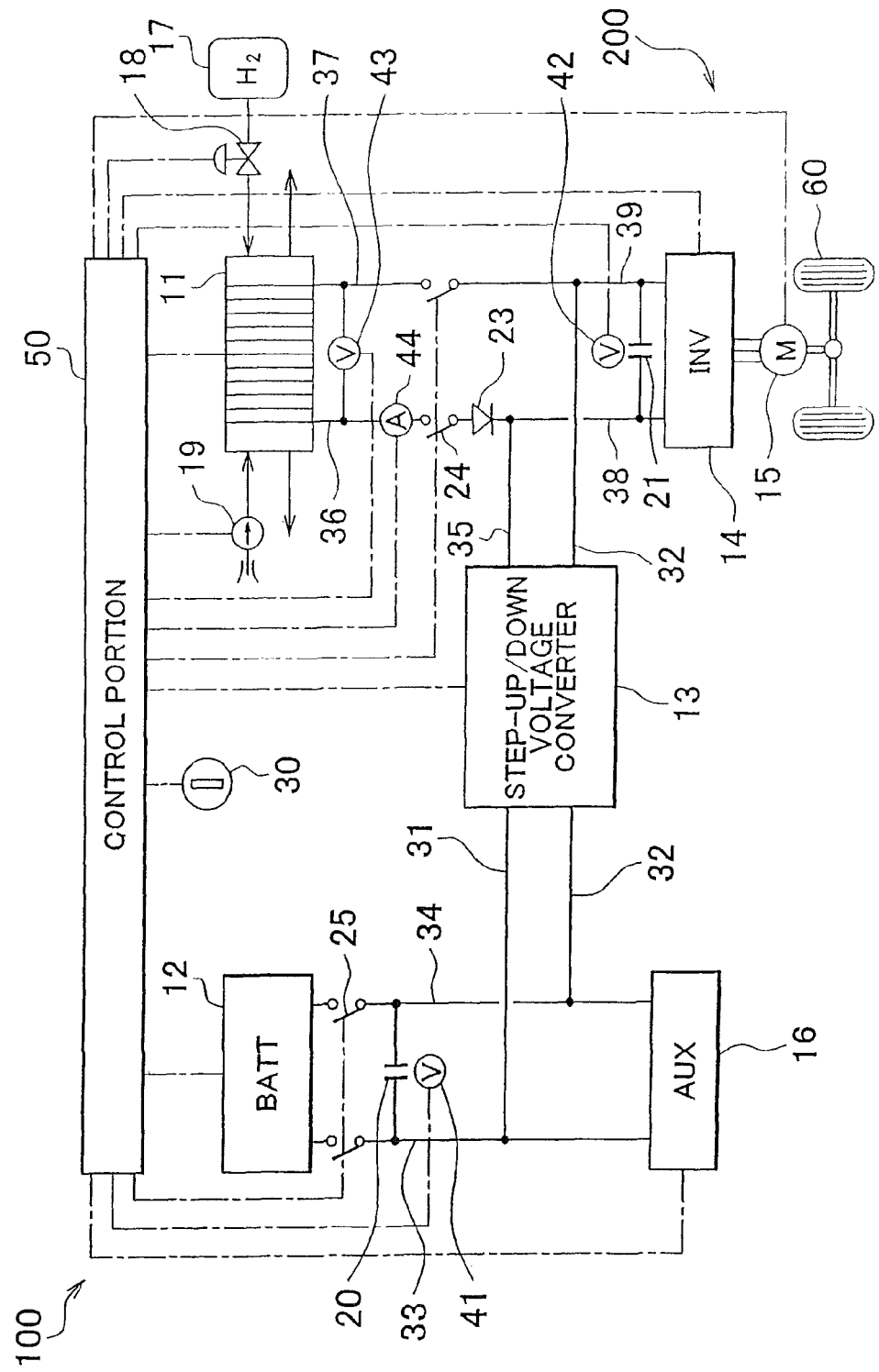
FIG. 1 is a system diagram of a fuel cell system in an embodiment of the invention.

As shown in FIG. 1, a fuel cell system 100 mounted in an electric vehicle 200 includes a chargeable and dischargeable secondary cell 12, a step-up/down voltage converter 13 that raises or lowers the voltage of the secondary cell 12, an inverter 14 that converts direct-current electric power of the step-up/down voltage converter 13 into alternating-current electric power, and supplies the electric power to a traction motor 15, and a fuel cell 11.

The secondary cell 12 is constructed of a chargeable and dischargeable lithium-ion battery, or the like. The voltage of the secondary cell 12 in this embodiment is lower than the drive voltage of the traction motor 15. However, the voltage of the secondary cell is not limited so, but may also be a voltage that is equivalent to or higher than the drive voltage of the traction motor. The step-up/down voltage converter 13 has a plurality of switching elements, and raises a low voltage supplied from the secondary cell 12 into a high voltage for use for driving the traction motor, by on/off-operations of the switching elements. The step-up/down voltage converter 13 is a non-insulated bidirectional DC/DC converter whose reference electrical path 32 is connected to both a minus-side electrical path 34 of the secondary cell 12 and a minus-side electrical path 39 of the inverter 14, and whose primary-side electrical path 31 is connected to a plus-side electrical path 33 of the secondary cell 12, and whose secondary-side electrical path 35 is connected to a plus-side electrical path 38 of the inverter 14. Besides, the plus-side electrical path 33 and the minus-side electrical path 34 of the secondary cell 12 are each provided with a system relay 25 that turns on and off the connection between the secondary cell 12 and a load system.

The fuel cell 11 has a plurality of fuel unit cells that are supplied with hydrogen gas as a fuel gas and air as an oxidant gas, and that generate electricity through an electrochemical reaction between the hydrogen gas and the oxygen in the air. In the fuel cell 11, the hydrogen gas is supplied from a high-pressure hydrogen tank 17 to a fuel electrode (anode) via a hydrogen supply valve 18, and the air is supplied to an oxidant electrode (cathode) by an air compressor 19. A plus-side electrical path 36 of the fuel cell 11 is connected to the secondary-side electrical path 35 of the step-up/down voltage converter 13 via an FC relay 24 and a blocking diode 23. A minus-side electrical path 37 of the fuel cell 11 is connected to the reference electrical path 32 of the step-up/down voltage converter 13 via another FC relay 24. The secondary-side electrical path 35 of the step-up/down voltage converter 13 is connected to the plus-side electrical path 38 of the inverter 14, and the reference electrical path 32 of the step-up/down voltage converter 13 is connected to the minus-side electrical path 39 of the inverter 14. The plus-side electrical path 36 and the minus-side electrical path 37 of the fuel cell 11 are connected to the plus-side electrical path 38 and the minus-side electrical path 39, respectively, of the inverter 14, via the FC relays 24. The FC relays 24 turn on and off the connection between the load system and the fuel cell 11. When the FC relays 24 are closed, the fuel cell 11 is connected to the secondary side of the step-up/down voltage converter 13, so that the electric power generated by the fuel cell 11 is supplied together with the secondary-side electric power of the secondary cell 12 obtained by raising the voltage of the primary-side electric power of the secondary cell 12, to the inverter, which thereby drives the traction motor 15 that rotates wheels 60. At this time, the voltage of the fuel cell 11 becomes equal to the output voltage of the step-up/down voltage converter 13 and to the input voltage of the inverter 14. Besides, the drive electric power for the air compressor 19, and accessories 16 of the fuel cell 11, such as a cooling water pump, a hydrogen pump, etc., is basically provided by the voltage that is generated by the fuel cell 11. If the fuel cell 11 cannot generate the required electric power, the secondary cell 12 is used as a complement source.

A primary-side capacitor 20 that smoothes the low-voltage-side voltage is connected between the plus-side electrical path 33 and the minus-side electrical path 34 of the secondary cell 12. The primary-side capacitor 20 is provided with a voltage sensor 41 that detects the voltage between the two ends of the primary-side capacitor 20. Besides, a secondary-side capacitor 21 that smoothes the secondary-side voltage is provided between the plus-side electrical path 38 and the minus-side electrical path 39 of the inverter 14. The secondary-side capacitor 21 is provided with a voltage sensor 42 that detects the voltage between the two ends of the secondary-side capacitor 21. The voltage across the primary-side capacitor 20 is a primary-side voltage $V_L$ that is the input voltage of the step-up/down voltage converter 13, and the voltage across the secondary-side capacitor 21 is a secondary-side voltage $V_H$ that is the output voltage of the step-up/down voltage converter 13. Besides, a voltage sensor 43 that detects the voltage of the fuel cell 11 is provided between the plus-side electrical path 36 and the minus-side electrical path 37 of the fuel cell 11. The voltage sensor 43 also detects the cell voltage of each of the fuel unit cells that constitute the fuel cell 11.

Besides, the plus-side electrical path 36 of the fuel cell 11 is provided with an electric current sensor 44 that detects the output current of the fuel cell 11.

A control portion 50 is a computer that contains a CPU that performs signal processing, and a storage portion that stores programs and control data. The fuel cell 11, the air compressor 19, the hydrogen supply valve 18, the step-up/down voltage converter 13, the inverter 14, the traction motor 15, the accessories 16, the FC relays 24, and the system relays 25 are connected to the control portion 50, and are constructed so as to operate according to commands from the control portion 50. Besides, the secondary cell 12, the voltage sensors 41 to 43, and the electric current sensor 44 are separately connected to the control portion 50, and are constructed so that the state of the secondary cell 12, and detection signals of the voltage sensors 41 to 43 and the electric current sensor 44 are input to the control portion 50. The electric vehicle 200 is provided with an ignition key 30 that is a switch for starting and stopping the fuel cell system 100. The ignition key 30 is connected to the control portion 50, and is constructed so that an on/off-signal of the ignition key 30 is input to the control portion 50.

An operation of the fuel cell system 100 constructed as described above will be described with reference to FIG. 2 to FIG. 5. Regarding voltages shown below, the "initial voltage" is a voltage that is set initially, "starting voltage" is a voltage of a time of starting the fuel cell, and "command voltage" is a voltage that is commanded to the fuel cell in view of restrictions of the initial voltage and starting voltage etc.

Firstly, in the case where the command voltage that the command portion 50 commands to the fuel cell is dropped from the open-circuit voltage to a high-potential-avoiding voltage at slow speed for fear of overvoltage of the fuel cell, the amount of time of the drop from the open-circuit voltage to the high-potential-avoiding voltage becomes long. Furthermore, if the command voltage that the control portion commands to the fuel cell is dropped at low speed in the case where the initial voltage of the fuel cell (also referred to as "initial total cell voltage") is, closer to the high-potential-avoiding voltage than to 0 V, the upper-limit guard for the starting voltage of the fuel cell cannot be promptly provided within the time $T_1$, so that the voltage overshoots to a voltage above the high-potential-avoiding voltage (a portion of the curve of the total cell voltage that is enclosed by a dashed one-dotted line in FIG. 5).

Figure 2:
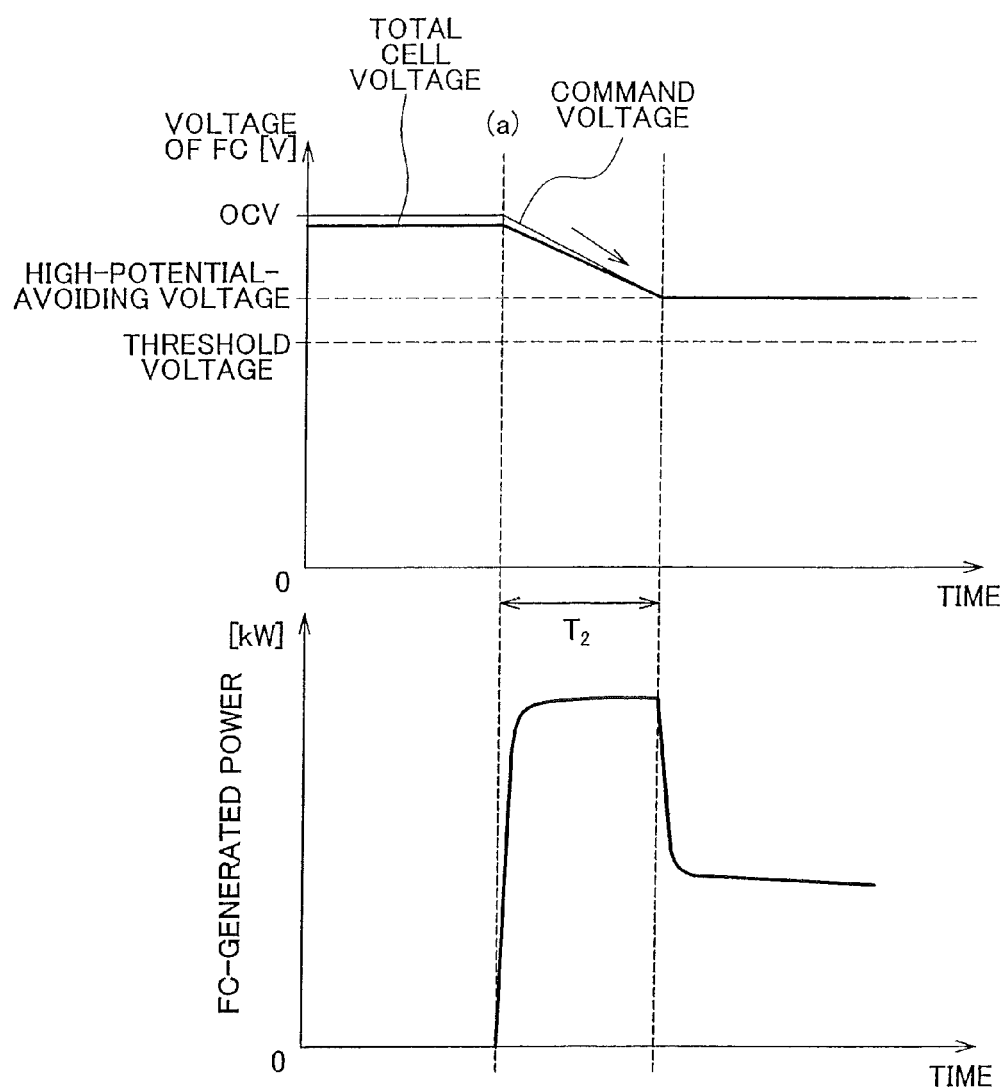
FIG. 2 is a diagram illustrating a voltage control of a fuel cell performed at the time of starting the fuel cell in the case where the initial voltage of the fuel cell is higher than a threshold voltage in the embodiment of the invention.
Figure 3:
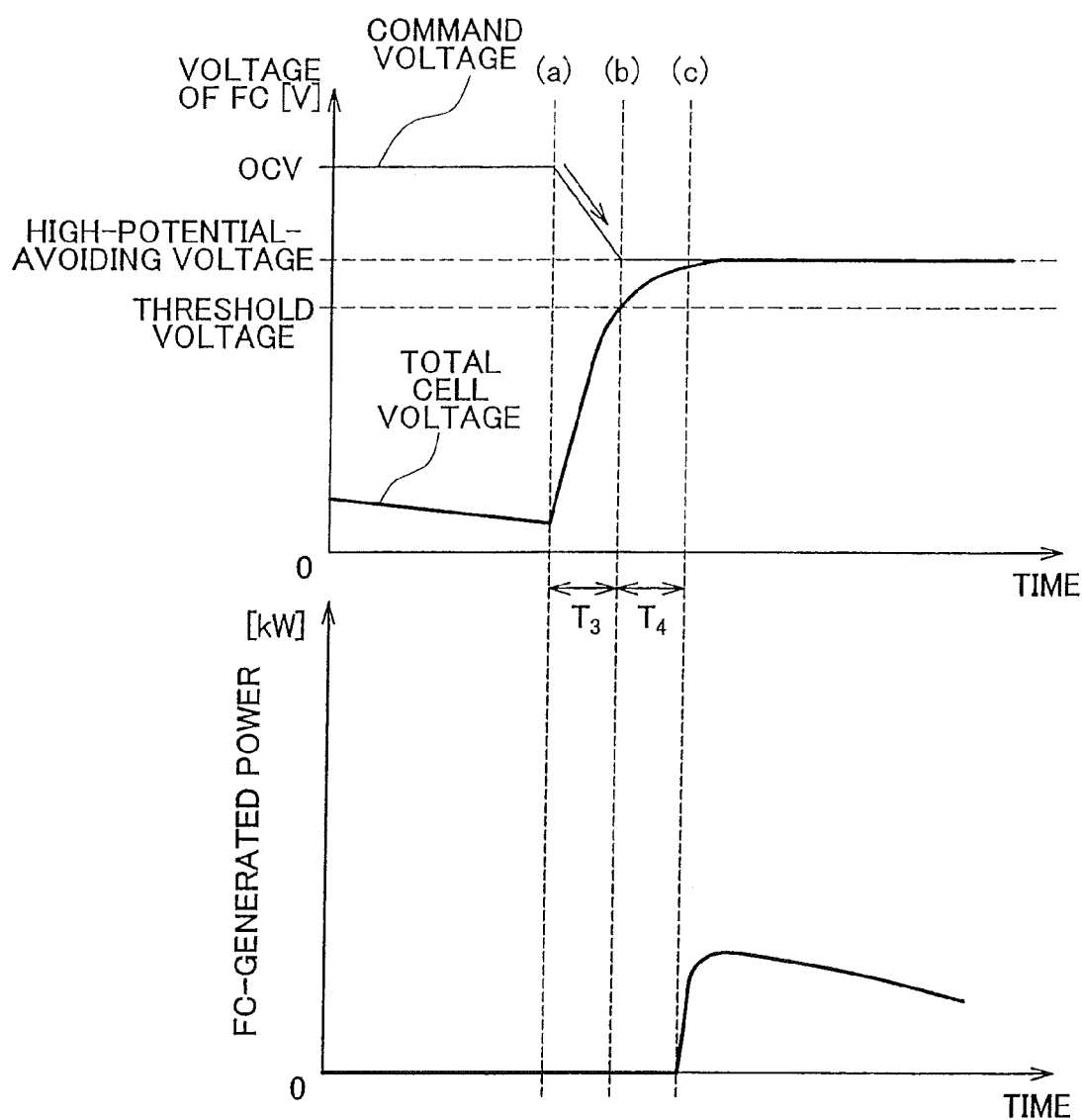
FIG. 3 is a diagram illustrating the voltage control of the fuel cell performed at the time of starting the fuel cell in the case where the initial voltage of the fuel cell is lower than the threshold voltage in the embodiment of the invention.

To avoid this, the speed of drop of the starting voltage of the fuel cell in this embodiment is adjusted according to the initial total cell voltage of the fuel cell (hereinafter, also referred to as "FC") and to a predetermined threshold voltage as shown in FIG. 2 and FIG. 3. Hereinafter, an operation of the fuel cell system in this embodiment will be described in conjunction with an example of the switching between the low-speed drop shown in FIG. 2 and the high-speed drop shown in FIG. 3, and also with reference to FIG. 4.

Incidentally, in this specification, the "high-potential-avoiding voltage" means a pre-determined target operation voltage of the fuel cell that is less than the OCV, and that can be generated by the fuel cell, so that durability of the fuel cell 11 will be certainly maintained.

The total cell voltage of the fuel cell stack immediately following the starting of the system varies in accordance with the duration of operation stop of the fuel cell. That is, the initial total cell voltage is closer to 0 V the longer the operation stop duration, and the initial total cell voltage is higher the shorter the operation stop time.

Therefore, prior to an overcharge-avoiding control of the secondary cell 12 performed before electricity generation of the fuel cell is permitted, the speed of drop of the starting voltage of the fuel cell is adjusted as described below by voltage drop control means that is provided in the control portion 50 (FIG. 1), in order to restrain the overcharge of the secondary cell caused by excessive electricity generation of the fuel cell.

Figure 4:
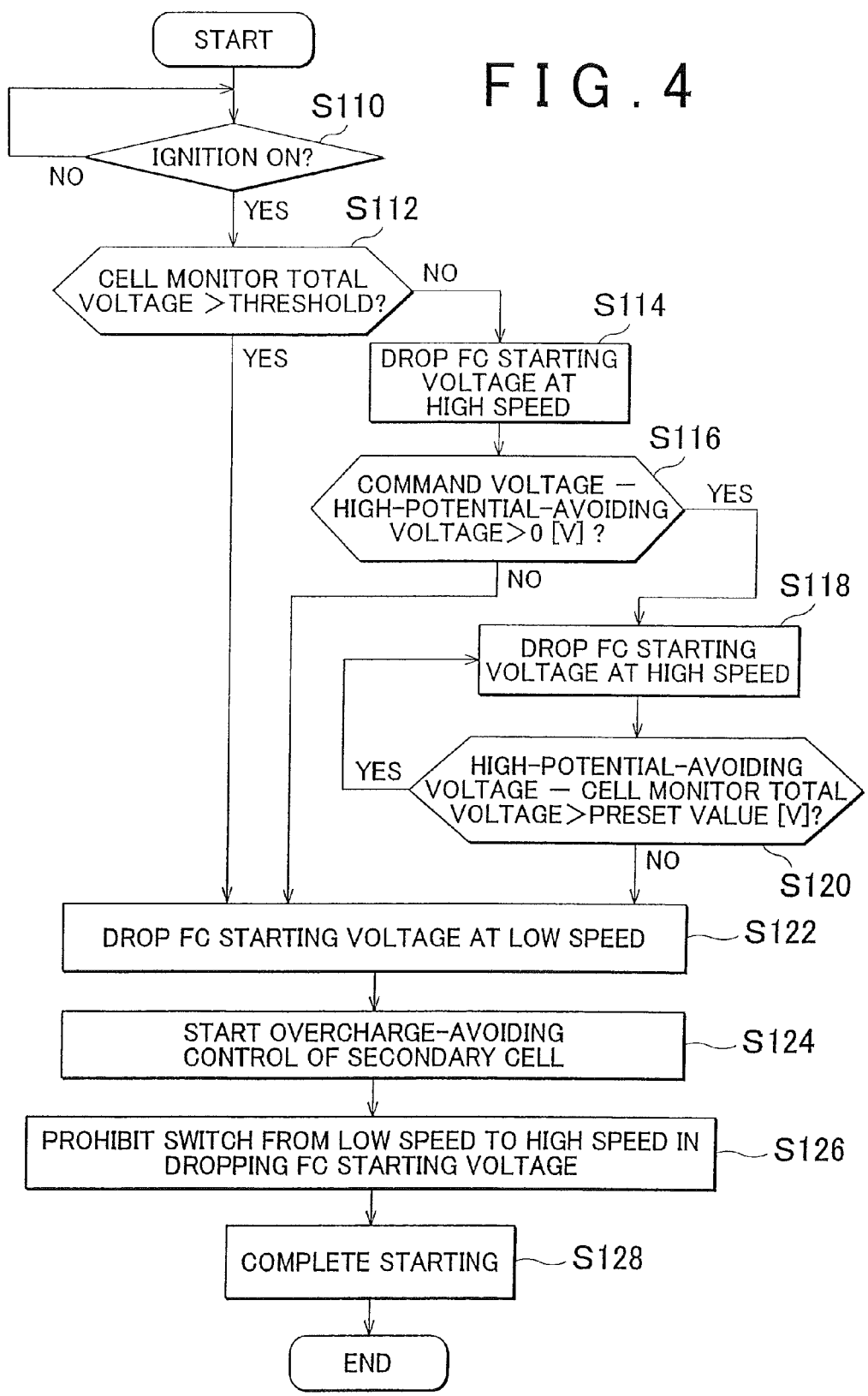
FIG. 4 is a flowchart illustrating the voltage control of the fuel cell at the time of start of a fuel cell system in the embodiment of the invention.
Figure 5:
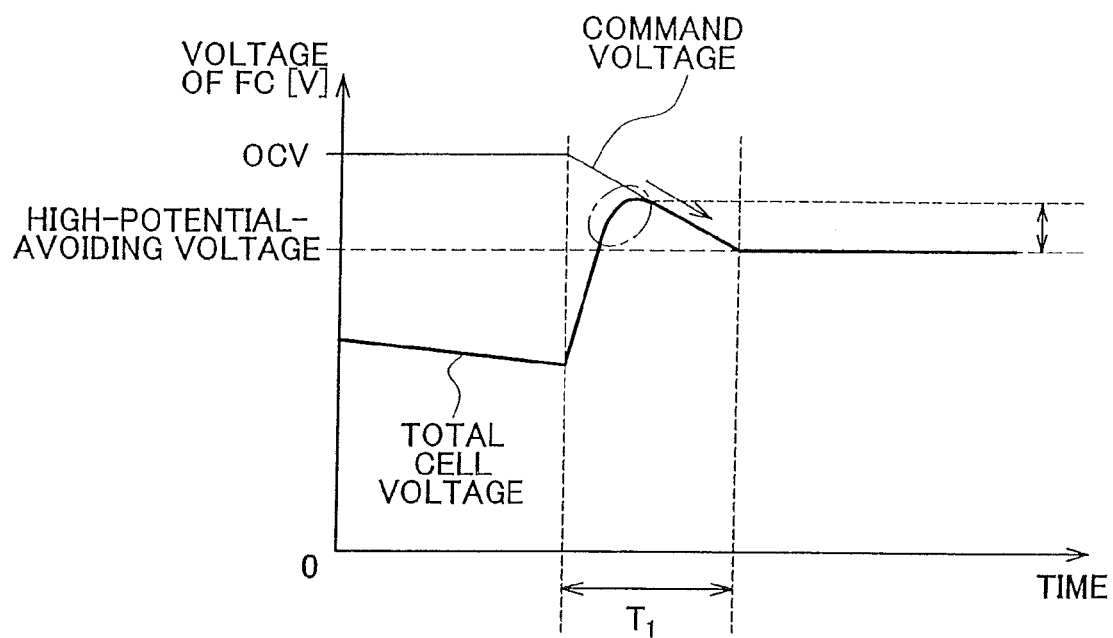
FIG. 5 is a diagram illustrating transition of the voltage of the fuel cell at the time of start in the case where the starting electric power of the fuel cell is always dropped at low speed in a related-art technology.

Firstly, when the ignition key 30 is turned on (YES in S110), the control portion 50 compares an initial total cell voltage of the fuel cell 11 measured by the voltage sensor 43 (that corresponds to "cell monitor total voltage" mentioned in FIG. 4) with a threshold voltage (S112). If, at the time point (a) in FIG. 2, the initial total cell voltage of the fuel cell measured by the voltage sensor 43 is greater than the threshold voltage (YES in S112), the control portion 50 slowly drops the starting voltage of the fuel cell at a low speed in a time $T_2$ (S122). It is to be noted herein that the "threshold voltage" is lower than the high-potential-avoiding voltage, and is stored beforehand in the control portion 50. By slowly dropping the starting voltage of the fuel cell as shown in FIG. 2, the amount of electricity generation of the fuel cell in the time $T_2$ can be restrained. In the case where the starting voltage of the fuel cell is dropped at the low speed, the overcharge-avoiding control of the secondary cell 12 is started by the control portion 50 (S124). Due to this, overcharge of the secondary cell 12 is prevented. It is to be noted herein that the "overcharge-avoiding control of the secondary cell 12" refers to a control in which, in order to avoid a situation where a load-requested electric power is exceeded so that the secondary cell 12 becomes overcharged, the amount of electricity generation of the fuel cell is managed as an overcharge-avoiding control of the secondary cell 12, while the state of charge of the secondary cell is being taken consideration through a feedback control and, in accordance with need, the amount of regeneration provided by the traction motor 15 is being taken into consideration.

Next, using drop speed switch prohibition means provided in the control portion 50, the control portion 50 prohibits the starting voltage of the fuel cell from being dropped to the high-potential-avoiding voltage at a high speed (S126), once the starting voltage of the fuel cell is dropped from the open-circuit voltage at the low speed to the high-potential-avoiding voltage. This drop speed switch prohibition means is not essential. However, for example, in the case where the starting voltage of the fuel cell changes in the vicinity of the threshold voltage, the drop speed switch prohibition means will prevent the excessive electricity generation of the fuel cell caused by the switching of the starting voltage drop speed from the low speed to the high speed.

Besides, the control portion 50 compares the initial total cell voltage of the fuel cell 11 measured by the voltage sensor 43 (that corresponds to the "cell monitor total voltage" mentioned in FIG. 4) with a threshold voltage (S112). If, at the time point (a) in FIG. 3, the initial total cell voltage of the fuel cell measured by the voltage sensor 43 is less than or equal to the threshold voltage (NO in S112), the control portion 50 promptly drops the starting voltage of the fuel cell (S114) at the high speed in a time $T_3$. Next, if, at a time point (b) in FIG. 3, the difference between the high-potential-avoiding voltage and the command voltage that the control portion 50 commands to the fuel cell becomes 0 V (NO in S116), the control portion promptly switches to the low-speed drop (S122). Then, the control portion 50 starts the overcharge-avoiding control of the secondary cell 12 (S124), and prohibits the starting voltage of the fuel cell from being dropped to the high-potential-avoiding voltage at the high speed (S126), and thus controls the starting voltage of the fuel cell at the low speed. This manner of control restrains the overcharge of the secondary cell 12 caused by excessive electricity generation of the fuel cell 11 in a time $T_4$ in FIG. 3.

On the other hand, at the time point (b) in FIG. 3, if the difference between the high-potential-avoiding voltage and the command voltage that the control portion 50 commands to the fuel cell is greater than 0 V (YES in S116), the control portion drops the starting voltage of the fuel cell to the high-potential-avoiding voltage at the high speed (S118). The voltage sensor 43 sends the cell monitor total voltage to the control portion 50 while monitoring the starting voltage of the fuel cell 11. Therefore, if at a time point (c) in FIG. 3, the difference between the high-potential-avoiding voltage and the cell monitor total voltage of the fuel cell 11 measured by the voltage sensor 43 is greater than a predetermined voltage value (YES in S120), the control portion drops the starting voltage of the fuel cell to the high-potential-avoiding voltage at the high speed (S118). On the other hand, if the difference between the high-potential-avoiding voltage and the cell monitor total voltage of the fuel cell 11 measured by the voltage sensor 43 has become equal to the predetermined voltage value (NO in S120), the control portion 50 promptly switches to the low-speed drop (S122), and starts the overcharge-avoiding control of the secondary cell 12 (S124), and prohibits the starting voltage of the fuel cell from being dropped to the high-potential-avoiding voltage at the high speed (S126), and controls the starting voltage of the fuel cell at the low speed. Thus, the starting of the fuel cell is completed (S128).

Incidentally, the "predetermined voltage value" mentioned in S120 in FIG. 4 is appropriately selected, in consideration of the amount of time that is needed for the feedback control of the time or the like in which the difference between the high-potential-avoiding voltage and the cell monitor total voltage of the fuel cell 11 measured by the voltage sensor 43. Therefore, the foregoing "predetermined voltage value" may be 0 V in the case where the calculation speed is extremely fast and the feedback control can be performed extremely fast.

The invention is applicable to fields that use fuel cell systems, for example, the vehicle manufacturing industry, and the like.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

The invention claimed is:

1. A fuel cell system comprising:
   a fuel cell that generates electricity through an electrochemical reaction between a fuel gas and an oxidant gas, and a control portion that controls amount of electricity generation at a time of starting the fuel cell,
   wherein the control portion has a voltage drop control section that controls speed of dropping a starting voltage of the fuel cell from an open-circuit voltage to a high-potential-avoiding voltage according to an initial voltage of the fuel cell and to a pre-determined threshold voltage that is lower than the high-potential-avoiding voltage, when the starting voltage of the fuel cell is dropped from the open-circuit voltage to the high-potential-avoiding voltage.

2. The fuel cell system according to claim 1, wherein:
the voltage drop control section drops the starting voltage of the fuel cell from the open-circuit voltage to the high-potential-avoiding voltage at the high speed if the initial voltage of the fuel cell is less than or equal to the threshold voltage;
if the starting voltage of the fuel cell is dropped at the high speed, and a difference between the high-potential-avoiding voltage and a command voltage commanded to the fuel cell reaches 0, the voltage drop control section completes a control for dropping the starting voltage of the fuel cell to the high-potential-avoiding voltage at the high speed;
if the starting voltage of the fuel cell is dropped at the high speed, and a difference between the high-potential-avoiding voltage and a total fuel cell voltage is smaller than a predetermined value, the voltage drop control section completes a control for dropping the starting voltage of the fuel cell to the high-potential-avoiding voltage at the high speed; and
the voltage drop control section drops the starting voltage of the fuel cell from the open-circuit voltage to the high-potential-avoiding voltage at the low speed if the initial voltage of the fuel cell is greater than the threshold voltage.

3. The fuel cell system according to claim 1, wherein:
the voltage drop control section drops the starting voltage of the fuel cell from the open-circuit voltage to the high-potential-avoiding voltage at high speed if the initial voltage of the fuel cell is less than or equal to the threshold voltage; and
the voltage drop control section drops the starting voltage of the fuel cell from the open-circuit voltage to the high-potential-avoiding voltage at low speed provided that the initial voltage of the fuel cell is greater than the threshold voltage, and that a difference between the high-potential-avoiding voltage and a command voltage that is commanded to the fuel cell is greater than 0 or a difference between the high-potential-avoiding voltage and a total fuel cell voltage is greater than a predetermined value.

4. The fuel cell system according to claim 2, further comprising a drop speed switch prohibition section that prohibits the starting voltage of the fuel cell from being dropped to the high-potential-avoiding voltage at the high speed, once the starting voltage of the fuel cell is dropped from the open-circuit voltage to the high-potential-avoiding voltage at the low speed.

5. The fuel cell system according to claim 2, further comprising:
a secondary cell that is chargeable and dischargeable, and that is charged with electric power that is output from the fuel cell,
wherein after the voltage drop control section drops the starting voltage of the fuel cell from the open-circuit voltage to the high-potential-avoiding voltage at the low speed, the control portion starts an overcharge-avoiding control of the secondary cell.

6. A vehicle that has the fuel cell system according to claim 1.

7. The fuel cell system according to claim 3, further comprising a drop speed switch prohibition section that prohibits the starting voltage of the fuel cell from being dropped to the high-potential-avoiding voltage at the high speed, once the starting voltage of the fuel cell is dropped from the open-circuit voltage to the high-potential-avoiding voltage at the low speed.

8. The fuel cell system according to claim 3, further comprising:
a secondary cell that is chargeable and dischargeable, and that is charged with electric power that is output from the fuel cell,
wherein after the voltage drop control section drops the starting voltage of the fuel cell from the open-circuit voltage to the high-potential-avoiding voltage at the low speed, the control portion starts an overcharge-avoiding control of the secondary cell.

* * * * *